United States Patent [19]

Morimoto

[11] Patent Number: 4,947,953

[45] Date of Patent: Aug. 14, 1990

[54] DRIVE SPEED CONTROL SYSTEM FOR A MOTOR VEHICLE HAVING A CONTINUOUSLY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 232,801

[22] Filed: Aug. 16, 1988

[30] Foreign Application Priority Data

Aug. 31, 1987 [JP] Japan ................................ 62-217550

[51] Int. Cl.⁵ ............................................. B60K 31/04
[52] U.S. Cl. .............................. 180/179; 364/426.04; 74/866
[58] Field of Search ....................... 180/178, 179, 176; 364/426.04, 424.1; 74/866

[56] References Cited

U.S. PATENT DOCUMENTS

| 4,519,469 | 5/1985 | Hayashi et al. | 180/170 |
| 4,709,595 | 12/1987 | Hayama | 180/177 |
| 4,737,913 | 4/1988 | Blee et al. | 180/179 |
| 4,763,813 | 4/1988 | Hayama et al. | 180/179 |
| 4,771,656 | 9/1988 | Itoh et al. | 74/866 |

FOREIGN PATENT DOCUMENTS 60-135335  7/1985  Japan ............................ 364/426.04

Primary Examiner—Charles A. Marmor
Assistant Examiner—Tamara L. Finlay
Attorney, Agent, or Firm—Martin A. Farber

[57] ABSTRACT

A control system for a motor vehicle has a continuously variable transmission, a transmission ratio control system for controlling the transmission ratio, and a cruise control system for controlling speed of the vehicle to a desired cruising speed. A coasting switch is provided for producing a coasting signal during cruising of the vehicle. In response to the coasting signal, a throttle valve of the engine is closed, and the transmission ratio is downshifted by a predetermined value.

9 Claims, 4 Drawing Sheets

DRIVE SPEED CONTROL SYSTEM FOR A MOTOR VEHICLE HAVING A CONTINUOUSLY VARIABLE TRANSMISSION

BACKGROUND OF THE INVENTION

The present invention relates to a system for controlling transmission ratio and drive speed for a motor vehicle, and more particularly to a system for decelerating the vehicle during a constant speed drive.

In a control system for a constant speed drive (hereinafter called a cruise control system) for a motor vehicle having an automatic transmission, when coasting, that is, deceleration of the vehicle, is selected by the driver, the vehicle is decelerated by reducing the opening degree of a throttle valve without downshifting of the transmission. In an ordinary automatic transmission, the transmission ratio is stepwisely changed. Accordingly, if the transmission is downshifted during the coasting, the vehicle is excessively decelerated with a shock, thereby impairing the driving characteristic. Thus, it is preferable to decelerate the vehicle by closing the throttle valve.

Japanese patent application Laid-Open No. 60-135335 discloses a cruise control system for a motor vehicle with a continuously variable belt-drive automatic transmission (CVT) wherein a current control means is provided for controlling current passing to a vacuum operated throttle actuator in accordance with the difference between a set vehicle speed Vs and an actual vehicle speed V. A correcting means is provided for correcting transmission ratio i for the transmission in accordance with current or a control signal for the current control means, thereby controlling the actual vehicle speed V to the set vehicle speed Vs.

However, the deceleration rate of the vehicle speed depends solely on the reduction rate of the engine torque. Thus, the vehicle is slowly decelerated. Accordingly, the driver, feeling a dangerous delay of the deceleration, depresses a brake pedal, which causes cancelling of the cruise control. In order to resume the cruise control, the setting operation must be done.

SUMMARY OF THE INVENTION

The object of the present invention is to provide a cruise control system for a vehicle having a CVT where the vehicle is sufficiently and quickly decelerated at coasting without causing shock.

According to the present invention, there is provided constant speed drive control system for a motor vehicle having an engine with a throttle valve, a continuously variable transmission, a transmission ratio control system for the transmission, and a cruise control system for controlling speed of the vehicle to a desired cruising speed. The cruise control system has a coasting switch for producing a coasting signal.

In response to the coasting signal, an actuator is operated to close the throttle valve, and the transmission is downshifted.

The other objects and features of this invention will become understood from the following description with reference to the accompanying drawings.

DETAILED DESCRIPTION OF THE PREFERRED EMBODIMENT

Figure 1:
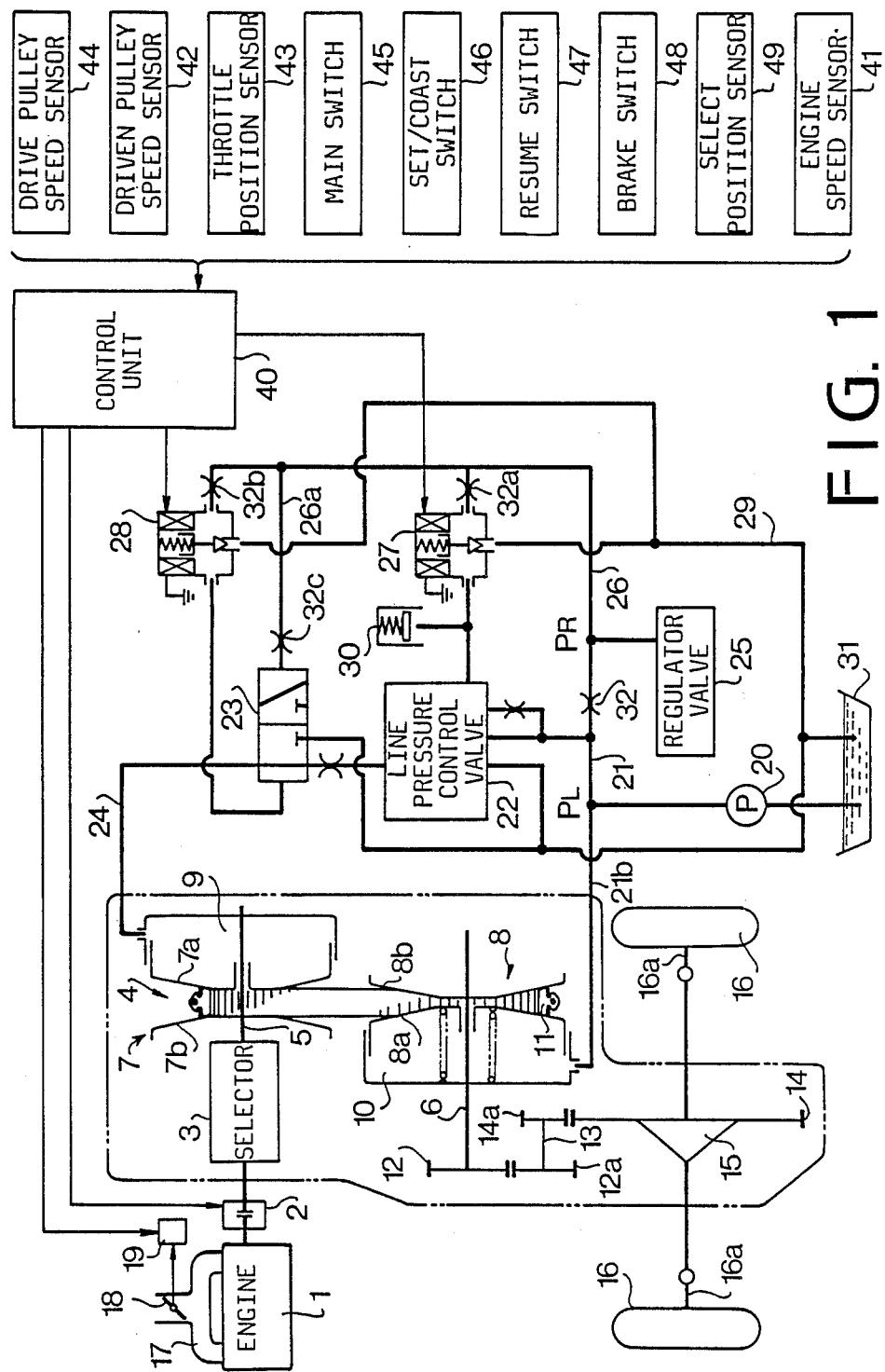
FIG. 1 is a schematic illustration of a power transmission system including a continuously variable belt-drive transmission for a motor vehicle according to the present invention.

Referring to FIG. 1, a motor vehicle is provided with an engine 1, and an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9 formed on the main shaft 5 to provide a servo device.

A fixed conical disc 8b of the driven pulley 8 is formed on the output shaft 6 opposite a movable conical disc 8a which is axially slidably mounted on the output shaft 6. The conical disc 8a has a cylindrical portion which is slidably engaged in a cylinder 10 of the output shaft 6 to form a servo device. A drive belt 11 engages with the drive pulley 7 and the driven pulley 8.

The cylinder 9 of the drive pulley 7 is so designed that the pressure receiving area thereof is larger than that of the cylinder 10 of the driven pulley 8. Thus, the running diameter of the drive belt 11 on the pulleys is varied by hydraulic pressure control of the cylinder 9 dependent on driving conditions.

Secured to the output shaft 6 is a drive gear 12 which engages with an intermediate reduction gear 12a on an intermediate shaft 13. An intermediate gear 14a on the shaft 13 engages with a final gear 14. The rotation of the final gear 14 is transmitted to axles 16a of vehicle driving wheels 16 through a differential 15.

A throttle valve 18 is mounted in an intake manifold 17 of the engine 1. An actuator 19 is operatively connected to the throttle valve 18 for controlling the throttle valve 18 in accordance with an output signal from a control unit 40.

Describing a hydraulic circuit of the transmission 4, the cylinder 9 of the drive pulley 7 is supplied with pressurized oil by an oil pump 20 from an oil reservoir 31 passing through a line pressure passage 21, a line pressure control valve 22, transmission ratio control valve 23, and passage 24. The cylinder 10 of the driven pulley 8 is applied with pressurized oil through a passage 21b. The passage 21 is further communicated with a regulator valve 25 through an orifice 32. A constant pressure of oil regulated at the regulator valve 25 is provided in a passage 26. The passage 26 is communicated with an end chamber of the line pressure control valve 22, a solenoid operated on-off valve 27 and an accumulator 30 through an orifice 32b, with an end chamber of the transmission ratio control valve 23 and a solenoid operated on-off valve 28 through an orifice 32b, and with the other end chamber of the valve 23 through a passage 26a and an orifice 32c. The solenoid operated valves 27 and 28 are operated by duty signals from the control unit 40. When energized, the valves 27 and 28 are communicated with a drain passage 29. Thus, actuating pressures controlled by the on-off valves 27 and 28 are applied to control valves 22 and 23.

The line pressure control valve 22 controls the line pressure PL in accordance with the transmission ratio of the transmission.

The transmission ratio control valve 23 has a spool which is shifted to an oil supply position by control oil in the opposite end chambers, communicating the passage 21 with the passage 24 and to an oil drain position for draining the oil from the passage 24. The operating conditions in two positions vary in accordance with the duty ratio, so that the flow rate of oil supplied to or drained from the cylinder of the drive pulley 7 is controlled to provide optimum transmission ratio in dependency on the opening degree of the throttle valve and the speed of the engine.

The control unit 40 consisting of a microcomputer is provided with the transmission ratio control system and the line pressure control system, to which the cruise control system is operatively connected.

Figure 2:
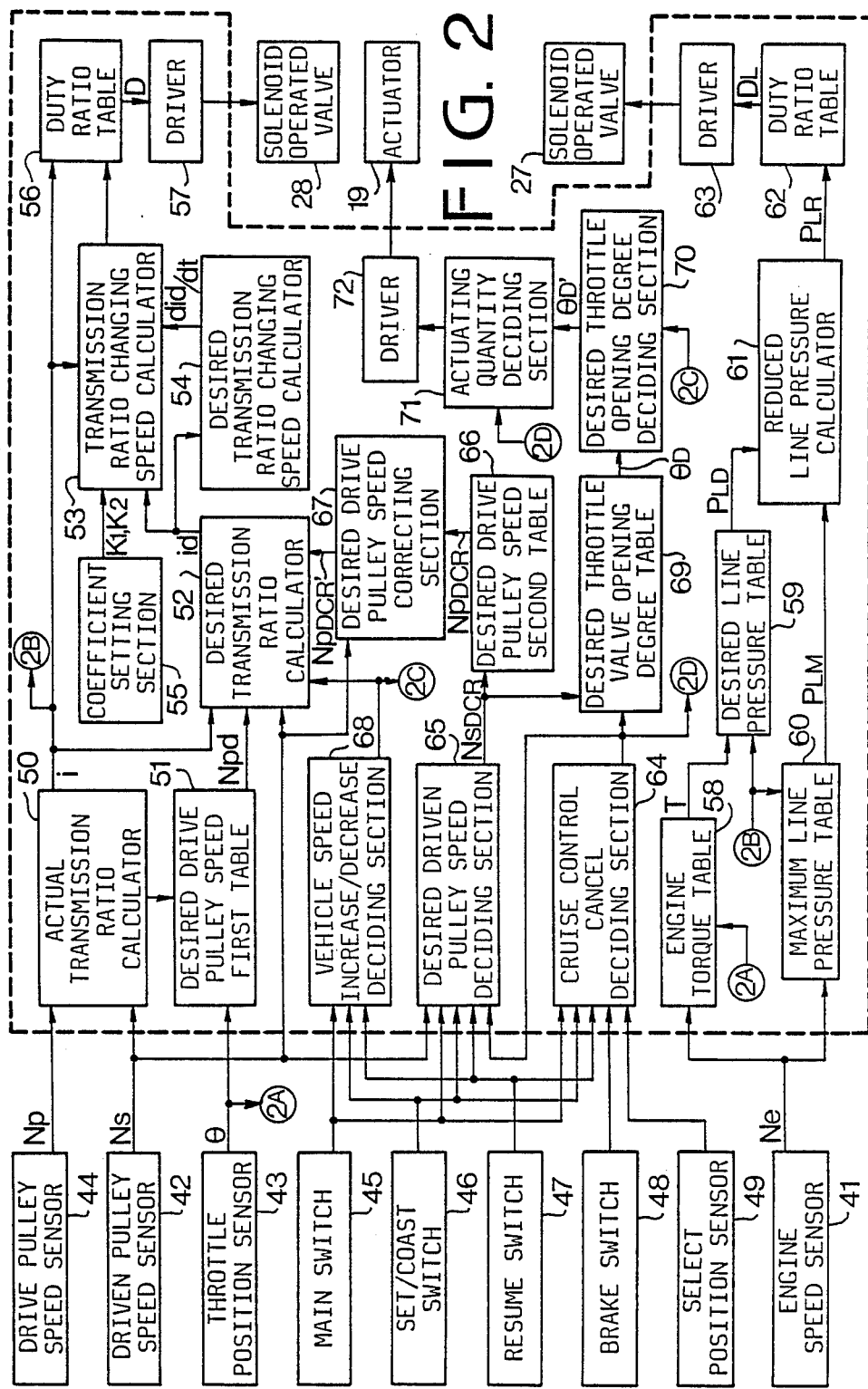
FIG. 2 shows a block diagram of a control unit of the system according to the present invention.

Referring to FIG. 2, the control unit has a drive pulley speed sensor 44, driven pulley speed sensor 42, throttle valve position sensor 43, main switch 45 for starting the cruise control, set/coast switch 46, brake switch 48, engine speed sensor 41, resume switch 47, and select position sensor 49. The set/coast switch 46 is adapted to produce a cruise set signal when a button of the switch is depressed for a short period and to produce a coast signal while the button is continuously depressed over a predetermined period.

A system for controlling the transmission ratio and the line pressure will be described. Output signals $N_P$ and $N_s$ of sensor 44, 42 are fed to an actual transmission ratio calculator 50 to produce an actual transmission ratio i in accordance with $i = N_P/N_s$. The actual transmission ratio i and output signal $\theta$ of the throttle position sensor 43 are fed to a desired drive pulley speed first table 51 to derive a desired drive pulley speed Npd in accordance with values of the ratio i and signal $\theta$. The desired drive pulley speed Npd and the driven pulley speed $N_s$ are fed to a desired transmission ratio calculator 52 to calculate a desired transmission ratio id in accordance with the speeds Npd and $N_s$ which corresponds to vehicle speed.

The desired transmission ratio id is fed to a desired transmission ratio changing speed calculator 54 which produces a desired transmission ratio changing rate did/dt. The speed did/dt is the amount of change of the desired transmission ratio id during a predetermined time interval. A coefficient setting section 55 is provided for producing coefficients K1 and K2. The actual transmission ratio i, desired transmission ratio id, desired transmission ratio changing rate did/dt and coefficients K1 and K2 are applied to a transmission ratio changing rate calculator 53 to produce a transmission ratio changing speed di/dt from the following formula.

$$di/dt = K1 \, (id - i) + K2 \cdot did/dt$$

In the formula, the term of $(id - i)$ is a control quantity dependent on the difference between the desired and actual transmission ratios and did/dt is a term for advancing the phase of the control operation.

The rate di/dt and actual ratio i are applied to a duty ratio table 56 to derive a duty ratio D in accordance with $D = f\,(di/dt, i)$ using a table at upshift and downshift of the transmission. The duty ratio D is supplied to a solenoid operated on-off valve 28 through a driver 57.

On the other hand, engine speed Ne from the engine speed sensor 41 and throttle opening degree $\theta$ from the throttle position sensor 43 are applied to an engine torque table 58 to derive an engine torque T. The engine torque T and the actual transmission ratio i from the calculator 50 are applied to a desired line pressure table 59 to derive a desired line pressure $P_{LD}$.

In the hydraulic circuit, oil pressure discharged from the pump varies in accordance with the change of the engine speed Ne, so that a maximum line pressure $P_{LM}$ also varies. In order to detect the variance of the maximum line pressure $P_{LM}$, the control unit is provided with a maximum line pressure table 60 to which the engine speed Ne and the actual transmission ratio i are supplied. Therefore, the maximum line pressure $P_{LM}$ is obtained.

The desired line pressure $P_{LD}$ and the maximum line pressure $P_{LM}$ are applied to a reduced line pressure calculator 61 wherein a reduced line pressure $P_{LR}$ is calculated based on the proportion of the desired line pressure $P_{LD}$ to the maximum line pressure $P_{LM}$. The reduced line pressure $P_{LR}$ is applied to a duty ratio table 62 to derive a duty ratio $D_L$ corresponding to the reduced line pressure $P_{LR}$. The duty ratio $D_L$ is supplied to a driver 63 which operates a solenoid operated on-off valve 27 at the duty ratio.

Describing a system for the cruise control, a desired driven pulley speed deciding section 65 is applied with the driven pulley speed signal $N_s$ from the sensor 42, and output signals from switches 45 to 47.

When the main switch 45 for the cruise control is turned on and the set/coast switch 46 operates for a short period to produce the cruise signal, the desired driven pulley speed deciding section 65 operates to set the driven pulley speed $N_s$ applied to the section 65 at that time as a desired driven pulley speed $N_{SDCR}$, that is a desired cruising speed.

On the other hand, a cruise control cancel deciding section 64 is applied with output signals from the switches 45 to 48 and select position sensor 49. When the brake switch 48 is turned on, the set/coast switch 46 and the resume switch 47 are on at the same time, the select position sensor 49 produces a signal representing other ranges other than a D range, or the main switch 45 is turned off, the cruise control cancel deciding section 64 operates to cancel the cruise control, so that the desired driven pulley speed $N_{SDCR}$ and an amount for actuating the actuator 19 becomes zero.

At setting of the cruise control, the section 65 derives the desired driven pulley speed $N_{SDCR}$ in accordance with the driven pulley speed $N_s$. The output signal $N_{SDCR}$ is fed to a desired drive pulley speed second table 66 from which a desired drive pulley speed for the cruise control $N_{PDCR}$ is derived. The signal $N_{PDCR}$ is applied to a desired drive pulley speed correcting section 67 where a corrected desired drive pulley speed $N_{PDCR}'$ is calculated in dependency on the desired drive pulley speed $N_{PDCR}$ and driven pulley speed $N_s$ from the section 66 and the sensor 42.

A vehicle speed increase/decrease deciding section 68 is provided to be applied with output signals from the switches 45, 46 and 47 to produce an acceleration signal or a deceleration signal. The acceleration or the deceleration signal is applied to the desired transmission ratio calculator 42 to which the output signal of the correcting section 67 is applied, so as to obtain the desired transmission ratio id.

The output signals of the desired driven pulley speed deciding section 65 and cruise control cancel deciding section 64 are applied to a desired throttle valve opening degree table 69 so as to derive a desired throttle valve opening degree $\theta D$ during the cruise control. The desired throttle valve opening degree $\theta D$ is applied to a desired throttle valve opening degree correcting section 70 to which the acceleration or deceleration signal from the section 68 is applied so as to correct the desired opening degree $\theta D$. A corrected desired opening degree $\theta D'$ is applied to a throttle actuator actuating quantity deciding section 71, to which the output signal from the section 64 is applied. The section 71 determines an actuator actuating quantity in accordance with the throttle opening degree $\theta$ and the corrected desired degree $\theta D'$. An output signal of the section 71 is applied through a driver 72 to the actuator 19 comprising a DC servo motor. The throttle valve 18 is controlled for providing the desired opening degree $\theta D'$.

Figure 3:
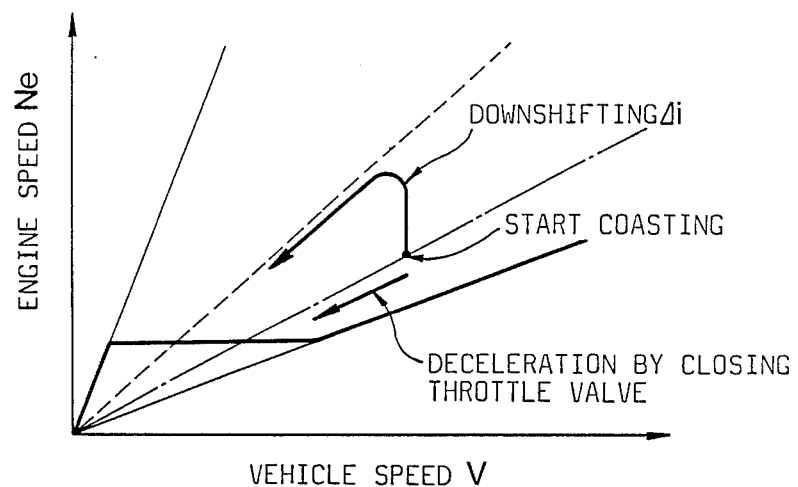
FIG. 3 is a graph showing a characteristic of the transmission ratio in accordance with the present invention.
Figure 4:
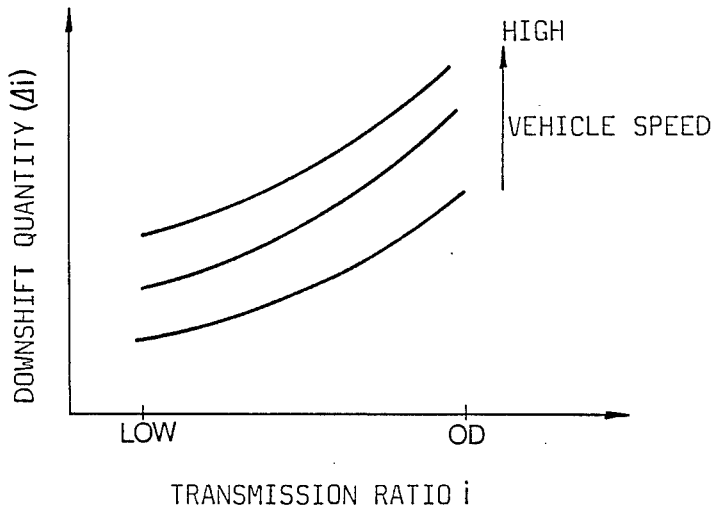
FIG. 4 is a graph showing downshift quantities in relation to the actual transmission ratio and vehicle speed.

When the button of the set/coast switch 46 is continuously depressed over a predetermined period to produce the coast signal, the vehicle speed increase/decrease deciding section 68 feeds a deceleration signal to the desired transmission ratio calculator 52 and the throttle opening degree correcting section 70. In the calculator 52, a downshift quantity $\Delta i$ is added to the actual transmission ratio i at that time so as to downshift the transmission. As shown in FIG. 4, the downshift quantity $\Delta i$ is a function at least of the actual transmission ratio i and driven pulley speed $N_s$, which is the present vehicle speed. Accordingly, the transmission is downshifted as shown by an arrow in Fig. 3.

On the other hand, the desired throttle opening degree correcting section 70 produces a signal so as to reduce the actuating quantity of the throttle actuator when the deceleration signal is applied thereto. Accordingly, the throttle valve is closed little by little thereby reducing the torque of the engine.

Figure 5:
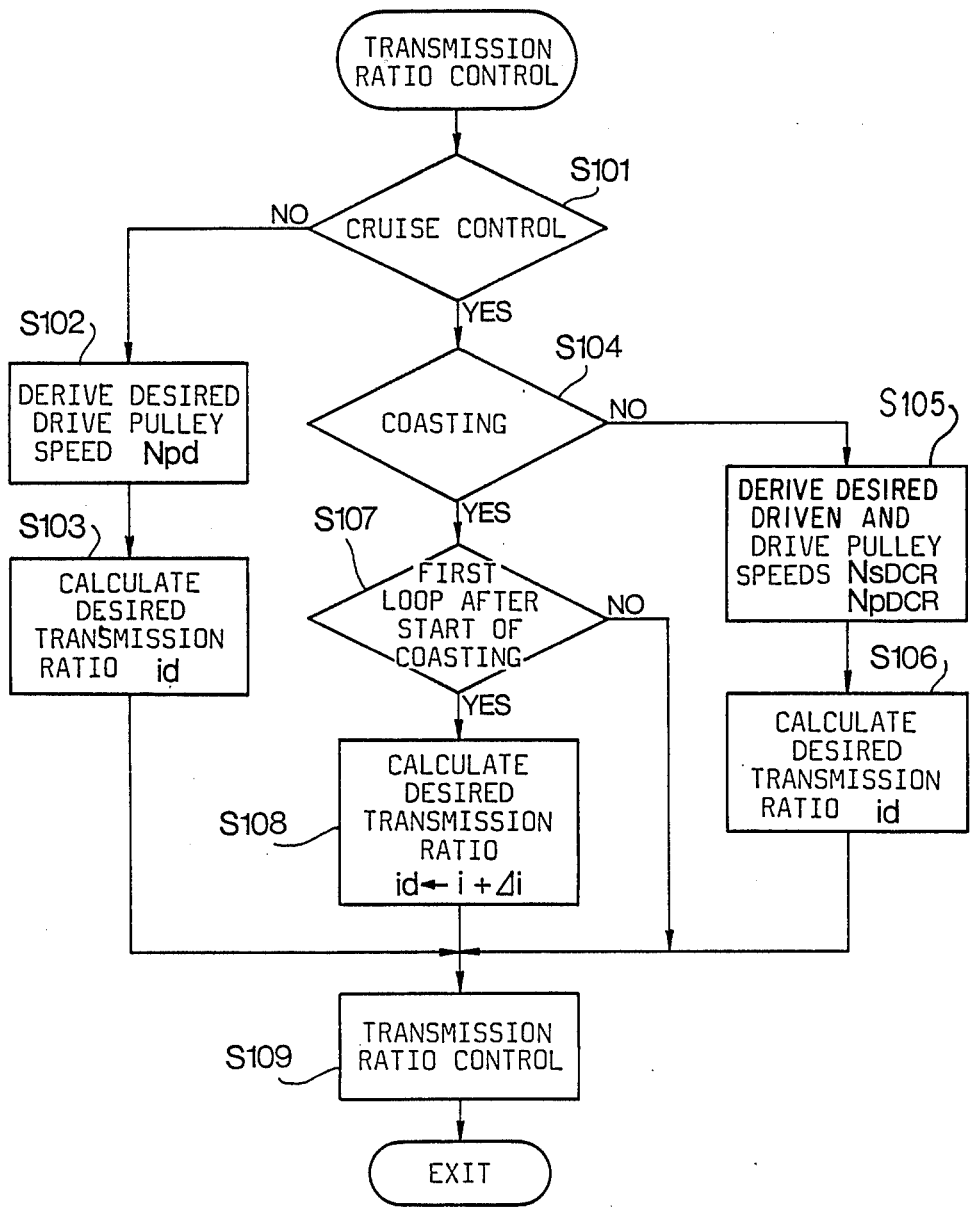
FIG. 5 is a flowchart showing the transmission ratio control operation of the system according to the present invention.

The operation of the system for controlling the transmission ratio will be described hereinafter with reference to the flowchart shown in FIG. 5.

At a step S101, it is determined whether the vehicle is in a cruise control. When the vehicle is not in cruise control, the program proceeds to a step S102 where the desired drive pulley speed $N_{pd}$ is derived from the first table 51 and further to a step S103 where the desired transmission ratio id is obtained. Thereafter, the program goes to a step S109 for the normal transmission ratio control.

If the cruise control is determined at the step S101, it is determined at a step 104 whether coasting is selected by the set/coast switch 46. If coasting is not selected, the desired driven speed $N_{SDCR}$ and the desired drive pulley speed $N_{PDCR}$ are derived from the respective tables 65 and 66 at a step S105. At a step S106, the desired transmission ratio id is calculated at the calculator 52. The program further proceeds to the step S109.

When coasting is determined at the step S104, it is further determined at a step S107 whether the program is in the first loop immediately after the coasting signal was generated. If it is in the first loop, at a step S108, the downshift quantity $\Delta i$ is added to the actual transmission ratio i at the desired transmission ratio calculator 52. Accordingly, the transmission is downshifted at the step S109 as shown in FIG. 3. Thus, engine braking is effected. When the program is in a loop succeeding the first loop, the program proceeds directly to the step S109 from the step S107.

Thus, the transmission is downshifted right after the coasting is selected. The throttle opening degree is decreased at a large transmission ratio than at cruising so that, as shown in the graph of FIG. 3, the vehicle is decelerated at a larger deceleration than the above described conventional cruising system.

Although in the presently described embodiment, the transmission downshifting quantity $\Delta i$ is set as a function of the actual transmission ratio i and driven pulley speed $N_s$ which is the vehicle speed, the quantity $\Delta i$ may be set as a constant value.

From the foregoing, it will be understood that the present invention provides a cruise control system for a motor vehicle having a continuously variable transmission, wherein when a vehicle is intended for coasting, the vehicle speed can be decreased at a large deceleration by downshifting the transmission a predetermined quantity, as well as by closing the throttle valve. Accordingly, the driver need not to depress the brake pedal in order to decelerate. Thus the cruise control is kept.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A drive speed control system for a motor vehicle with a continuously variable transmission connected to an engine, wherein an actual speed of the engine and an actual transmission ratio of said transmission are automatically controlled in a cruise control mode, so that actual vehicle speed coincides with a desired vehicle speed, the engine having a throttle valve of which its opening degree is automatically changed by a throttle actuator in said cruise control mode, the improvement of the system which comprises:

first deciding means for deciding deceleration of said motor vehicle in said cruise control mode by producing a deceleration signal after selecting of coasting;

calculating means for calculating a desired transmission ratio in response to said deceleration signal; and driving means responsive to said desired transmission ratio for downshifting the transmission from said actual transmission ratio to said desired transmission ratio so as to immediately decrease power of said engine for deceleration without delay; and throttle valve control means responsive to said deceleration signal for actuating said throttle actuator for moving said throttle valve in a closing direction; and said calculating means adds a downshift quantity to the actual transmission ratio of the transmission so as to calculate the desired transmission ratio.

2. The system according to claim 1, wherein said downshift quantity is a function of the actual transmission ratio and the actual vehicle speed.

3. The system according to claim 2, wherein
the downshift quantity increases with increasing actual vehicle speed and actual transmission ratio.

4. The system according to claim 1, wherein
said downshift quantity is set as a constant value.

5. A drive speed control system for a motor vehicle having an engine with a throttle valve, a continuously variable transmission, a transmission ratio control system for the transmission, and a cruise control system for controlling speed of said vehicle to a desired cruising speed, comprising:
   the cruise control system having a coasting switch for producing a coasting signal during cruising controlled by the cruise control system;
   an actuator responsive to the coasting signal for closing the throttle valve;
   means responsive to said coasting signal for downshifting said transmission by a value:
   the continuously variable transmission having a drive pulley having a hydraulically shiftable disc and a hydraulic cylinder for operating the disc, a driven pulley having a hydraulically shiftable disc and a hydraulic cylinder for operating said disc of the driven pulley, and a belt engaged with both pulleys, a hydraulic circuit having a pump for supplying oil to both said hydraulic cylinders, said transmission ratio control system having desired transmission ratio providing means responsive to an actual transmission ratio and engine load and the desired cruising speed for producing a desired transmission ratio, and a transmission ratio control valve for controlling the oil supplied to the cylinder of said drive pulley to change the transmission ratio to the desired transmission ratio, and said value is a predetermined value and is added to said actual transmission ratio; and
   said predetermined value is a function of the actual transmission ratio and speed of the driven pulley.

6. A drive speed control system for a motor vehicle with a continuously variable transmission connected to an engine, wherein an actual speed of the engine and an actual transmission ratio of said transmission are automatically controlled in a cruise control mode, so that actual vehicle speed coincides with a desired vehicle speed, the engine having a throttle valve of which its opening degree is automatically changed by a throttle actuator in said cruise control mode, the improvement of the system which comprises:
   first deciding means for deciding deceleration of said motor vehicle in said cruise control mode by producing a deceleration signal after selecting of coasting;
   calculating means for calculating a desired transmission ratio in response to said deceleration signal; and
   driving means responsive to said desired transmission ratio for downshifting the transmission from said actual transmission ratio to said desired transmission ratio so as to immediately decrease power of said engine for deceleration without delay; and
   throttle valve control means responsive to said deceleration signal for actuating said throttle actuator for moving said throttle valve in a closing direction; and
   said throttle valve control means comprises,
   first correcting means for determining a desired opening degree of said throttle valve in dependency on said desired vehicle speed;
   second deciding means responsive to said deceleration signal for correcting said desired opening degree of said throttle valve for deciding to move said throttle valve in the closing direction;
   second correcting means responsive to corrected desired opening degree of said throttle valve for changing said actual engine speed to a desired engine speed by means of said throttle actuator moving said throttle valve in the closing direction; and
   said second correcting means provides a throttle actuating quantity in accordance with actual opening degree of the throttle valve and the corrected desired opening degree of said throttle valve.

7. The system according to claim 6, wherein
said second deciding means provides the corrected desired opening degree of said throttle valve such that said second correcting means reduces said throttle actuating quantity upon occurrence of said deceleration signal so as to move said throttle valve in the closing direction little by little.

8. A drive speed control system for a motor vehicle with a continuously variable transmission connected to an engine, wherein an actual speed of the engine and an actual transmission ratio of said transmission are automatically controlled in a cruise control mode, so that actual vehicle speed coincides with a desired vehicle speed, the engine having a throttle valve of which its opening degree is automatically changed by a throttle actuator in said cruise control mode, the improvement of the system which comprises:
   first deciding means for deciding deceleration of said motor vehicle in said cruise control mode by producing a deceleration signal after selecting of coasting;
   calculating means for calculating a desired transmission ratio in response to said deceleration signal; and
   driving means responsive to said desired transmission ratio for downshifting the transmission from said actual transmission ratio to said desired transmission ratio so as to immediately decrease power of said engine for deceleration without delay; and
   throttle valve control means responsive to said deceleration signal for actuating said throttle actuator for moving said throttle valve in a closing direction; and
   said throttle valve control means comprises second deciding means responsive to said deceleration signal for, via said throttle actuator, closing said throttle valve little by little.

9. A drive speed control system for a motor vehicle with a continuously variable transmission connected to an engine, wherein an actual speed of the engine and an actual transmission ratio of said transmission are automatically controlled in a cruise control mode, so that actual vehicle speed coincides with a desired vehicle speed, the engine having a throttle valve of which its opening degree is automatically changed by a throttle actuator in said cruise control mode, the improvement of the system which comprises:
   first deciding means for deciding deceleration of said motor vehicle in said cruise control mode by producing a deceleration signal after selecting of coasting;
   calculating means for calculating a desired transmission ratio in response to said deceleration signal; and driving means responsive to said desired transmission ratio for downshifting the transmission from said actual transmission ratio to said desired transmission ratio so as to immediately decrease power of said engine for deceleration without delay; and throttle valve control means responsive to said deceleration signal for actuating said throttle actuator for moving said throttle valve in a closing direction; and said calculating means is for calculating the desired transmission ratio representing the downshifting of the transmission in a first loop of a program immediately in response to the deceleration signal.

* * * * *